(No Model.)
W. A. GRAUTEN.
RAIL BOND.
No. 527,785. Patented Oct. 23, 1894.
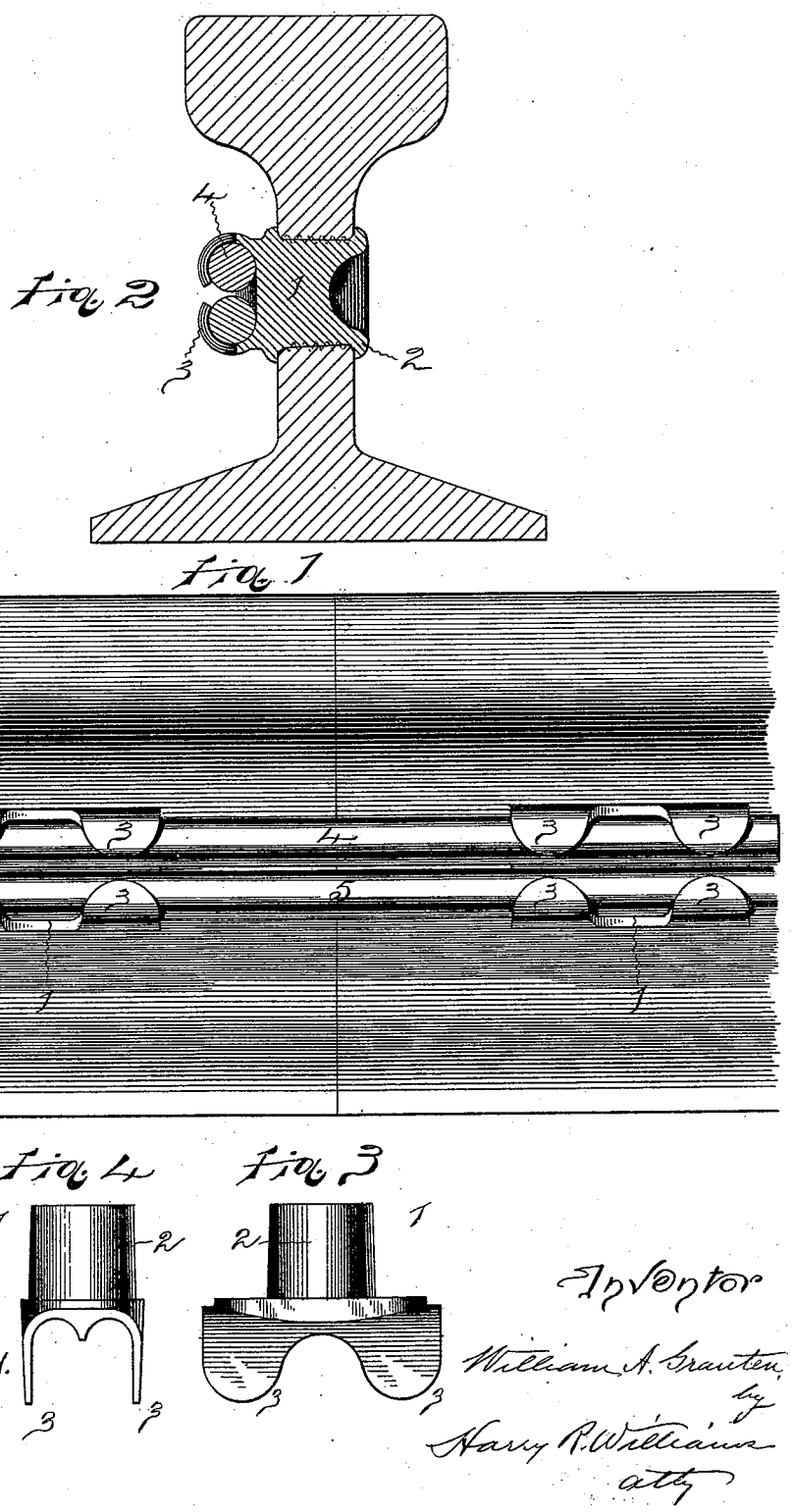

UNITED STATES PATENT OFFICE.

WILLIAM A. GRAUTEN, OF HARTFORD, CONNECTICUT.

RAIL-BOND.

SPECIFICATION forming part of Letters Patent No. 527,785, dated October 23, 1894.

Application filed June 7, 1894. Serial No. 513,771. (No model.)

*To all whom it may concern:*

Be it known that I, WILLIAM A. GRAUTEN, a citizen of the United States, residing at Hartford, in the county of Hartford and State of Connecticut, have invented certain new and useful Improvements in Rail-Bonds, of which the following is a specification.

The invention relates to the bonding or joining of the rails of a street or other railway with electrical conducting connections when such rails are to form a portion of the conducting circuit for the motive current of a trolley or other electric railway or a current for signaling purposes; and the object is to provide a cheap, simple and small bond that can be easily made to securely hold the bonding and supplementary wires, and which can be very cheaply and firmly secured in permanent position by either riveting, heading or screwing to a rail from which it can be removed without trouble, if desired.

Referring to the accompanying drawings; Figure 1 is a view of the meeting ends of two rails joined by the bond. Fig. 2 is a sectional view of one of the rails and a bond clip. Fig. 3 is a side view, and Fig. 4 is an edge view of a bond clip before it has received the wires.

The rails which the bond is to join may be of any common form and may be used for any purpose, and through the webs of these rails near their meeting ends are made small perforations or tapped holes for receiving the shanks of the bond clips. These bond clips 1 each are provided with a circular shank 2 that is preferably made either slightly tapering or threaded in order that it may be driven or secured in and made to tightly fit the perforation or tapped hole made for it through the web of the rail. In the body of the bond clip, usually at about right angles to the length of the shank are two troughs or wire grooves, the outer walls of which are formed by four outward extending ears 3, one pair at each end. These ears are so made that they can be bent or folded upon the wires that are to be grasped by them, the two ears on one side being fastened around and securely holding the bond wire 4, while the other two on the opposite side may grasp and hold another bond wire 5 or a supplementary wire that may lead to a return wire, or it may hold the return wire itself.

The end of the shank 2 of the bonding clip is hollowed out or somewhat concaved so that when it is driven or screwed through the perforation into the web of the rail any common form of eyeleting or similar tool may be used to run or head over the outer edges of this concaved portion of the end of the shank. By making this in the manner described, the shank can be quickly driven or screwed through a perforation in the rail web and easily and instantly headed over by one blow upon the proper tool which, besides being quickly and easily done, leaves the shank in such shape that when it is desired to remove the bond clip these turned over edges may be bent back and the shank driven through the perforation. This is easier and quicker than hammering or riveting over a head and relieves the parts of a considerable pounding and, of course, there is not as much strain on the rails as when the bond clips are secured in position by much hammering. With clips constructed in this manner the bonding wires can be quickly and easily fastened so as to be securely held in place with but little labor, and at the same time a firm and secure holding pocket is provided for grasping and holding a supplementary wire that may lead to a return circuit wire, or for holding the return wire itself or another bond wire.

The device is very simple, cheap and easy to secure in place, and the bonding clips lie so close under the tread of the rail that they are not liable to be crushed by heavy teams or other weights passing along near the rails. The wires can be quickly as well as very securely fastened in place with this form of bonding clip, and can be relieved therefrom when desired without trouble.

I claim as my invention—

1. A rail bond consisting of a body having a turned or threaded shank with a hollow end, and with a plural number of wire grooves, the outer walls of the wire grooves being formed by outward extending ears, and a bonding and a supplementary wire grasped by the ears, substantially as specified.

2. A rail bond consisting of a body having a turned or threaded shank for passing through a perforation or tapped hole in the rail, a plural number of wire grooves, the outer walls of the wire grooves being formed by outward extending ears, and a bonding and a supplementary wire grasped by the ears, substantially as specified.

3. A rail bond consisting of a body having a turned or threaded shank for passing through a perforation or tapped hole in the rail, with a plural number of wire grooves, the outer walls being formed to fold over a bonding and a supplementary wire, and a bonding and a supplementary wire held in the grooves, substantially as specified.

WILLIAM A. GRAUTEN.

Witnesses:
H. R. WILLIAMS,
H. H. LUSCOMB.